US006679383B2

(12) United States Patent
Gathje et al.

(10) Patent No.: US 6,679,383 B2
(45) Date of Patent: Jan. 20, 2004

(54) FLOTATION OF PLATINUM GROUP METAL ORE MATERIALS

(75) Inventors: John C. Gathje, Longmont, CO (US); Gary L. Simmons, Castle Rock, CO (US)

(73) Assignee: Newmont USA Limited, Denver, CO (US)

( * ) Notice: Subject to any disclaimer, the term of this patent is extended or adjusted under 35 U.S.C. 154(b) by 0 days.

(21) Appl. No.: 10/273,428

(22) Filed: Oct. 17, 2002

(65) Prior Publication Data

US 2003/0146135 A1 Aug. 7, 2003

Related U.S. Application Data

(60) Provisional application No. 60/332,624, filed on Nov. 21, 2001.

(51) Int. Cl.[7] .................................................. B03D 1/14
(52) U.S. Cl. ....................................................... 209/166
(58) Field of Search ................................. 209/166, 167

(56) References Cited

U.S. PATENT DOCUMENTS

| 2,048,370 | A | * | 7/1936 | Brinker |
| 2,052,214 | A | * | 8/1936 | Brinker |
| 2,070,076 | A | * | 2/1937 | Brown |
| 3,655,044 | A | * | 4/1972 | Delaney |
| 5,653,945 | A |   | 8/1997 | Gathje et al. ................. 423/26 |
| 5,837,210 | A | * | 11/1998 | Simmons |
| 5,855,770 | A | * | 1/1999 | Clark et al. |
| 6,032,805 | A | * | 3/2000 | Clark et al. |
| 6,036,025 | A | * | 3/2000 | Clark et al. ................. 209/164 |
| 6,044,978 | A | * | 4/2000 | Newell et al. |
| 6,092,666 | A | * | 7/2000 | Clark et al. |
| 6,210,648 | B1 |  | 4/2001 | Gathje et al. ................. 423/26 |

FOREIGN PATENT DOCUMENTS

CA  1070034  * 1/1980

OTHER PUBLICATIONS

Ferron, C.J. et al., "Mineralogy and Selective Upgrading of a Gold–Platinum Flotation Concentrate", EPD Congress 1994, Minerals, Metals & Materials Society, (1994), pp. 21–32.
Penberthy, C.J. et al., "The Recovery of Platinum–Group Elements from the UG–2 Chromitite, Bushveld Complex –A Mineralogical Perspective", Mineralogy and Petrology, vol. 68, pp. 213–222 (2000).

* cited by examiner

Primary Examiner—Thomas M. Lithgow
(74) Attorney, Agent, or Firm—Marsh Fischmann & Breyfogle LLP (57) ABSTRACT

Provided is a method involving flotation of a feed of platinum group metal ore material to prepare a platinum group metal concentrate during mineral processing operations. Prior to and/or during the flotation, a lead-containing activator reagent and a xanthate collector reagent are added to the slurry and during the flotation, an oxygen-deficient flotation gas, such as nitrogen gas, is used.

60 Claims, 2 Drawing Sheets

FLOTATION OF PLATINUM GROUP METAL ORE MATERIALS

CROSS-REFERENCE TO RELATED APPLICATIONS

This application claims a priority benefit under 35 U.S.C. §119(e) to U.S. Provisional Patent Application No. 60/332,624 by Gathje entitled "FLOTATION OF PLATINUM GROUP METAL ORE MATERIALS" filed Nov. 21, 2001, the entire contents of which are incorporated herein as if set forth herein in full.

FIELD OF THE INVENTION

The present invention involves flotation of platinum group metal ore materials during mineral processing operations.

BACKGROUND OF THE INVENTION

Platinum group metals (PGMs) include platinum (Pt), palladium (Pd), rhodium (Rh), iridium (Ir), ruthenium (Ru) and Osmium (Os). The PGMs are chemically similar and have common useful properties, such as for example high conductivity, high resistance to corrosion and high catalytic activity. Significant quantities of PGMs are produced from magmatic ore deposits, and particularly basic magmatic ore deposits that are rich in iron and magnesium. Large quantities of PGMs are mined in South Africa and Russia, with smaller quantities being mined in other countries, such as Canada and the United States. Significant primary PGM mining operations are located in South Africa, with smaller PGM primary mining operations in the United States and Canada. By PGM primary mining operation, it is meant that PGMs represent the primary metal value in the ores that are mined. Significant PGM by-product mining operations are located in Russia and Canada, and particularly the Norilsk property in Russia, where large quantities of PGMs are produced as by-products from nickel/copper ores.

PGMs in PGM magmatic ore deposits can occur in sulfide and non-sulfide minerals. Examples of platinum group metal sulfide minerals include braggite ((Pt, Pd, Ni)S), Cooperite (PtS), vysotskite (PdS), laurite ((Ru, Os, Ir)$S_2$) and malanite ((Pt, Rh, Ir)$_2$Cu$S_4$). Examples of PGM non-sulfide minerals include sperrylite (Pt$_4$As$_2$), moncheite (PtTe$_2$), platinum-iron alloys (e.g., PtFe, Pt$_3$Fe), various platinum and/or palladium bismuthinides, bismuth-tellurides, and sulfarsenides, rustenburgite (Pt$_3$Sn), isomertierite (Pd$_{11}$Sb$_2$As$_2$), arsenopalladinite ((Pd$_8$(As,Sb)$_3$), plumbopalladinite (Pd$_3$Pb$_2$), potarite (PdHg) and geversite (PtSb$_2$). In addition to discrete platinum group metal minerals, PGM values are also found in association with base metal sulfides, such as for example as inclusions in or attachments to a base metal sulfide or in solid solution in a base metal sulfide. Examples of base metal sulfides with which PGM values can be associated include nickel-containing sulfides, such as pentlandite ((Fe,Ni)$_9$S$_8$) and/or millerite (NiS), and to a lesser degree copper-containing sulfides, such as chalcopyrite (CuFe$S_2$). PGM metal values can also be associated with other sulfides, such as pyrrhotite. When PGMs are produced as a by-product it is often with nickel operations.

Typical mineral processing operations for PGM ores involve comminution followed by concentration of the PGMs by flotation. The PGM concentrate is then often processed by smelting and refining to produce purified PGM products. Flotation is a critical operation in PGM mineral processing operations, because a high quality concentrate is required for smelting operations and there is significant potential for loss of valuable PGMs to flotation tails during the preparation of such high quality concentrates. One significant complicating factor is that the basic magmatic PGM ore deposits frequently contain significant quantities of sheet silicate minerals, commonly talc (3MgO.4Si$O_2$.H$_2$O) or other talcose minerals. Because of a sheet-like geometry, talc and other sheet silicate minerals have a high natural tendency to float during flotation operations, and the presence of such minerals during flotation complicates preparation of high quality PGM concentrates. A common technique for addressing the high natural floatability of talc is to add an organic chemical depressant, such as for example carboxymethylcellulose (CMC). Large additions of CMC can be required to sufficiently depress talc, and such large additions of CMC can significantly complicate maintenance of desirable froth characteristics and the effectiveness of collectors. This can lead to the use of a complex flotation reagent scheme involving large quantities of reagents, and can result in a flotation operation that is not very robust, in that flotation performance can vary significantly with relatively modest changes in ore feed mineralogy and other characteristics of the feed slurry. The flotation operation can be susceptible to significant losses of PGMs to the tails and must be carefully monitored and controlled to minimize such losses. Also, the use of large quantities of reagents involves significant operational expense in reagent costs. Furthermore, with the use of such large additions of reagents, there can be a significant build-up of reagents in recycled process water which can further complicate processing.

There is a need for improved flotation processing to prepare high quality PGM flotation concentrates, and especially for processing PGM ores from basic magmatic ore deposits.

SUMMARY OF THE INVENTION

It is an object of the present invention to address problems noted above with respect to flotation of platinum group metal ore materials, such as for example a platinum group metal primary ore or by-product ore. The present invention provides a method involving flotation of platinum group metal ore materials in which a lead-containing activator reagent, and preferably also a xanthate collector reagent, are added to the platinum group metal ore material prior to and/or during flotation and the flotation is conducted using an oxygen-deficient flotation gas, such as nitrogen gas. With the present invention, flotation of platinum group metal ore materials, and especially those ore materials from basic magmatic ore deposits containing significant quantities of talc or other sheet silicate minerals, can be processed with enhanced recovery of platinum group metal in the flotation concentrate while at the same time promoting a more robust flotation operation that also often has lower reagent consumption. In particular, the flotation of the present invention can typically be performed without the addition of dithiophosphate collector reagents, while achieving a high recovery of platinum group metal in a high quality concentrate. Additionally, in one important embodiment, a depressant reagent is added prior to and/or during flotation to inhibit floating of sheet silicate minerals such as talc. The depressant reagent can often be employed without significant complication of the reagent scheme and without rendering flotation performance overly sensitive to variations in feed mineralogy and other feed slurry characteristics.

The ore material processed with the method of the present invention will include a quantity of platinum group metal with sufficient value to permit commercial mining and processing to recover platinum group metal. In the case of a platinum group metal primary ore, platinum group metal content in the platinum group metal ore material feed to flotation is often at least 1 gram per metric ton of ore, and often at least 5 grams per metric ton of ore, or even at least 10 grams or more per metric ton of ore. In the case of a platinum group metal by-product ore, the platinum group metal content in the ore material feed to flotation can be very low, because the predominant metal value in the ore will be base metal components such as copper and/or nickel. In the case of a platinum group metal primary ore material, the concentrate will typically contain platinum group metal of at least 5 grams per metric ton, more often at least 10 grams per metric ton and often at least 20 grams per metric ton or even 30 grams or more per metric ton. In the case of high grade platinum group metal primary ores, the platinum group metal content of the concentrate can be in excess, and sometimes significantly in excess, of 100 grams per ton of concentrate.

In one embodiment, the ore material includes, in addition to the platinum group metal, a recoverable quantity of one or both of nickel and copper that is concentrated in the concentrate along with platinum group metal during the flotation. In the case of processing a platinum group metal by-product ore, the platinum group metal concentrate will still typically comprise at least 0.5 weight percent and often at least 1 weight percent or even at least 2 weight percent or more of nickel and/or copper. In the case of a platinum group metal by-product ore, the concentrate will often comprise at least 5 weight percent, and typically at least 10 weight percent or even more of copper and/or nickel. In one particular application, the ore material contains significant pentlandite, millerite and/or chalcopyrite content in the flotation concentrate along with the platinum group metal.

In addition to the reagent and flotation gas combination used with the present invention, a significant difference of the present invention with respect to conventional flotation processing of platinum group metal ores is that with the present invention the flotation should be conducted at an acidic pH, preferably in a range of pH 3 to pH 6. Therefore, with the present invention, acid is typically added to the ore slurry prior to flotation to reduce the pH to the desired acidic range. This is a significant aspect of the present invention, because the natural pH exhibited by basic magmatic platinum group metal ores is basic, and conventional processing is to float these ores at a basic pH.

In one preferred embodiment for implementing the method of the present invention, the platinum group metal ore material is subjected to conditioning prior to flotation, to adjust pH of the slurry (typically to lower the pH to a desired acidic pH), to add the lead-containing activator and/or to add the collector reagent. Such conditioning can be performed in a single step or in a sequence of multiple steps. One possible enhancement for the conditioning is to bubble an oxygen-deficient flotation gas, such as nitrogen gas, through the slurry during one or more step during the conditioning. Another possible enhancement for the conditioning is to add a sheet silicatic depressant reagent to the slurry. Another possible enhancement is to add a reducing agent to the slurry during the conditioning to reduce the slurry Eh. Any one or more of these enhancements can be implemented alone or any combination with other of the enhancements. In one embodiment involving multiple sequential conditioning steps, the pH of the slurry is first adjusted to the desired acidic pH. Following pH adjustment, then the lead-containing activator reagent is added to the slurry, followed by separate addition of the collector reagent, preferably a xanthate collector reagent. In one possible enhancement to sequential conditioning, a sheet silicate depressant reagent can be added in a separate conditioning step following addition of the collector reagent. In another possible enhancement to sequential conditioning, an oxygen-deficient process gas, such as nitrogen gas, is bubbled through the slurry during one or more, and preferably all, of the multiple, sequential conditioning steps. In one embodiment, the conditioning includes addition of the lead-containing activator reagent prior to or during comminution of the platinum group metal ore material.

For enhanced performance, the Eh of the slurry during flotation should preferably be maintained at a low level to promote effective interaction between particles of the ore material, the lead-containing activator and the collector. In a preferred embodiment the Eh of the slurry immediately prior to and during flotation should be no higher than −50 mV, more preferably no higher than −100 mV, even more preferably no higher than −150 mV and still more preferably no higher than −200 mV (as measured against a platinum electrode relative to a silver/silver chloride reference). Often, an appropriately low Eh is achieved with the addition of acid to lower slurry pH. If further Eh reduction is desired, a reducing agent can be added to the slurry.

DETAILED DESCRIPTION

In one aspect, the present invention provides a method for flotation processing of platinum group metal ore materials to prepare a platinum group metal concentrate. The method involves flotation of a feed of the ore material in particulate form in a slurry with aqueous liquid. An oxygen-deficient flotation gas is used during the flotation and reagents including at least a collector reagent and a lead-containing activator reagent are added prior to and/or during the flotation. The flotation is typically conducted in one or more flotation cells or other suitable flotation vessels, which should be sealed to prevent escape of the oxygen-deficient flotation gas. The flotation gas is bubbled through the slurry in the flotation vessel using any suitable technique for introducing and dispersing the gas in the slurry. A flotation concentrate is recovered from froth collecting at the top of the slurry in the flotation vessel and a flotation tail is removed with slurry withdrawn from the bottom portion of the flotation vessel.

In a preferred embodiment, the oxygen-deficient flotation gas is recycled to reduce overall consumption of the oxygen-deficient flotation gas. One way to recycle the oxygen-deficient flotation gas is to draw gas off of headspace near the top of a sealed flotation vessel and reintroduce the gas into the slurry. This can be accomplished, for example, using a self-aspirating flotation vessel in which a gas distribution impeller in the slurry creates a vacuum in the slurry that siphons oxygen-deficient gas off of the headspace for reintroduction into the slurry via the gas distribution impeller. Other means of gas recycle can also be used, such as drawing gas of off the headspace to a blower that directs the flow of oxygen-deficient gas for reintroduction into the slurry.

The ore material in the feed to the flotation contains platinum group metal, meaning that the feed of the ore material contains one or more of platinum, palladium, rhodium, iridium, ruthenium and osmium. In most cases, the predominant component of platinum group metal in the feed of the ore material will be platinum, palladium or a combination of platinum and palladium. The ore material can be a platinum group metal primary ore or a platinum group metal by-product ore. By platinum group metal primary ore, it is meant that platinum group metal constitutes the primary metal value in the ore. By platinum group metal by-product ore, it is meant that some metal value or values other than the platinum group metal constitutes the primary metal value in the ore. The primary metal value in a by-product platinum group metal ore will typically be a base metal value of nickel and/or copper, and particularly nickel, with or without accompanying copper value. The ore material fed to the flotation can be the ore as initially comminuted and sized for flotation operations, or can be a product of a prior mineral processing operation. For example, the feed of the ore material to the flotation of the present invention could be a flotation concentrate or a flotation tail resulting from prior flotation operations. For example, when processing a platinum group metal by-product ore containing significant quantities of copper and nickel, multiple flotation separations may be involved to produced separate copper and nickel concentrates. The platinum group metal concentrate could be, for example, a copper concentrate, a nickel concentrate, or a bulk concentrate from which the nickel and copper concentrates are then prepared. In one preferred embodiment, the flotation of the present invention is a bulk flotation and the feed of the ore material is the ore as mined, comminuted and initially sized for flotation. When processing a platinum group metal by-product ore, the bulk concentrate will typically be concentrated also in the primary metal value(s) of the ore, such as nickel and/or copper.

During the flotation, the ore material will be in particulate form in a slurry with an aqueous liquid. The density of solids in the slurry can be any convenient density. In most situations the slurry will have a slurry density of from 20 to 45 weight percent solids. The ore material in the slurry can be sized at any size suitable for processing of the particular ore material. In most situations, the ore material in the slurry will be smaller than about 150 mesh (105 microns).

The flotation gas is oxygen-deficient, meaning that the flotation gas is either free of oxygen gas or contains a volume fraction of oxygen gas that is lower than the volume fraction of oxygen gas in ambient air. The flotation gas is preferably an inert gas that is essentially free of oxygen gas or has only a very low oxygen gas content. In a preferred embodiment, the flotation gas consists essentially of inert gas or has a very high content of inert gas, for example, nitrogen, argon, helium and/or carbon dioxide, with nitrogen gas being particularly preferred as the inert gas. The flotation gas preferably comprises at least 85 volume percent of inert gas, which may be a mixture of multiple inert gas components, more preferably at least 90 volume percent, even more preferably at least 95 volume percent, and most preferably the flotation gas consists essentially of only inert gas. When the flotation gas includes some oxygen gas, it should be only a small amount, as noted. Preferably, the flotation gas comprises no more than 15 volume percent oxygen gas, more preferably no more than 10 volume percent oxygen gas and even more preferably no more than 5 volume percent oxygen gas.

In addition to the use of a flotation gas containing no more than a small amount of oxygen gas, the flotation also involves the use of a specific combination of collector reagent and activator reagent. In particular, the activator reagent is a lead-containing material and the activator reagent is used in combination with a collector reagent. A preferred mode of operation is for the lead-containing activator reagent to be used in combination with a xanthate collector reagent. By collector reagent, it is meant a reagent that is added to the ore material to impart a coating to the surface of minerals to be floated to promote attachment of the mineral particles to rising bubbles of the flotation gas during flotation. By activator reagent, it is meant a reagent that is added to the ore material to interact with the surface of minerals to be floated to improve the coating action of the collector reagent. By reagent, it is meant a material that is added to the ore material to effect a desired chemical modification. In effecting the chemical modification, the reagent may undergo one or more chemical reactions that alter the chemical nature of the reagent in the slurry.

Because the preferred collector reagent for use with the present invention is a xanthate collector reagent used in combination with the lead-containing activator reagent, the following description will be presented in the context of using a xanthate collector reagent. Other collector reagents could, however, be used instead of or in addition to the xanthate collector reagent. For example, a dithiophosphate collector reagent could be used, but the use of such a collector reagent is not preferred, as discussed further below. Rather, it is preferred that the use of dithiophosphate collector reagents be avoided.

Xanthate collectors, and particularly alkyl xanthates, are commonly used in sulfide flotation operations. Any of the xanthate collectors used for sulfide flotation can be used with the present invention. Typical xanthate collectors are added as alkali metal salts, such as salts of potassium or sodium. Examples of some xanthate collector reagents that can be used with the present invention include potassium ethyl xanthate, potassium amyl xanthate, sodium isobutyl xanthate, and sodium isopropyl xanthate.

The lead-containing activator reagent can be any lead-containing material in which the lead is available during the flotation to assist the coating action of the xanthate collector reagent. By lead-containing, it is meant that the reagent includes lead within its chemical structure. Examples of some lead-containing activator reagents for use with the present invention include lead acetate, lead nitrate, lead carbonate and lead oxides (particularly litharge, PbO).

The xanthate collector reagent and the lead-containing activator reagent are added to the ore material during and/or prior to the flotation. Preferably substantially all of the xanthate collector reagent and lead-containing activator reagent are added prior to the flotation, such as during comminution (e.g., grinding or milling) and/or in one or more pre-flotation conditioning steps. The xanthate collector regent and lead-containing activator reagent can be added in a single conditioning step or can each be added separately during different conditioning steps. If added separately during different conditioning steps, preferably the lead-containing activator reagent is added prior to addition of the xanthate collector reagent. Each of the xanthate collector reagent and the lead-containing activator reagent can be added to the ore material in any convenient manner. Typically the xanthate collector reagent and the lead-containing activator reagent will be added to a slurry of the ore material. If added during a conditioning step, the slurry is preferably agitated for some time to condition the slurry. The agitation can be accomplished by a mechanical agitator (e.g., an impeller), preferably accompanied by bubbling an oxygen-deficient gas (such as having the properties described previously for the oxygen-deficient flotation gas) through the slurry. Also, the xanthate collector reagent and the lead-containing activator reagent can be added in solid particulate form or can be dissolved in a liquid medium that is added to the ore material slurry. The lead-containing activator reagent and the xanthate collector reagent can be used in any suitable quantities as applicable for the particular ore material being processed. In most situations, however, it is preferred to add only small quantities of the reagents, with the lead-containing activator reagent being added in an amount that is typically in a range of from 10 to 200 grams per metric ton of the ore material fed to the flotation and the xanthate collector reagent being added in an amount that is typically in a range of from 10 to 200 grams per metric ton of the ore material fed to the flotation.

In addition to the xanthate collector reagent and the lead-containing activator reagent, other reagents can be added to the ore material prior to and/or during flotation as deemed appropriate in the particular circumstances. For example, a frother reagent will typically be added to the ore material during and/or before the flotation, such as during comminution and/or a pre-flotation conditioning step. A frother reagent is any material added to help develop and/or maintain a froth at the surface of the slurry during flotation through stabilization of bubbles at the surface of the slurry, so that minerals attached to the bubbles can be easily removed with removal of the bubbles from the froth. Any suitable frother reagent or reagents can be used. Examples of some frother reagents include alcohol frothers (e.g., aliphatic alcohols, alicyclic alcohols, phenols) and glycol-based frothers (e.g., polyethylene glycols, polypropylene glycols, polypropylene glycol ethers). One example of a preferred frother is methylisobutyl carbinol (MIBC), an aliphatic alcohol. One example of a glycol-based frother is DOWFROTH™ 250 flotation frother from Dow Chemical Company.

In one important embodiment of the method of the invention, the ore material being processed contains a significant quantity of a sheet silicate mineral. Such ores will typically contain at least 1 weight percent, and often more, of one or more sheet silicate minerals. This will often be the case when processing basic magmatic ore material, in which case the sheet silicate mineral will typically be a magnesium-containing sheet silicate mineral, flotation of which needs to be suppressed to prevent the sheet silicate mineral from floating and being collected with the minerals containing platinum group metal. Examples of such sheet silicates include talc and other talcose minerals. As used herein, talcose minerals include talc and other magnesium-containing silicate minerals of similar structure to talc. Another example of such a magnesium-containing sheet silicate is serpentine ($Mg_6Si_4O_{10}(OH)_8$). As used herein, a sheet silicate mineral depressant reagent is any reagent added to reduce the natural tendency of the sheet silicate mineral or minerals in the ore material to float during the flotation. The sheet silicate mineral depressant material is typically an organic material, such as, for example, a polysaccharide-based, cellulosic, or starch-based material. One preferred cellulosic material for use as the sheet silicate mineral depressant is carboxymethylcellulose (CMC). Examples of starch-based materials for use as the sheet silicate mineral depressant are dextrins. Other examples of materials for use as the sheet silicate mineral depressant include glue, alum and various polymers. The sheet silicate mineral depressant can be added to the ore material at any time during and/or prior to flotation, but is preferably added during one or more pre-flotation conditioning steps.

In addition to the specific reagents noted above for use with the present invention, other reagents can be added prior to and/or during the flotation that may be useful in the particular situation. For example, a dispersant, such as a sodium silicate, might be used in some situations. Also, another collector in addition to the xanthate collector reagent could be added if desired. However, in a preferred embodiment, the xanthate collector reagent is the only collector reagent that is used. In particular, it is desirable with the method of the present invention to avoid the use of dithiophosphate collector reagents. In this way, complications that can arise with the use of dithiophosphate collector reagents are avoided. In particular, the use of dithiophosphate collector reagents can promote development of an overly stiff froth and can counteract benefits provided by the sheet silicate mineral depressant, requiring even larger additions of the sheet silicate mineral depressant to prevent flotation of significant quantities of the sheet silicate mineral. With this aspect of the present invention, by using the combination of the oxygen-deficient flotation gas, xanthate collector reagent and lead-containing activator reagent for flotation of platinum group metal ore materials, the use of dithiophosphate collectors and complications accompanying the use of dithiophosphate collectors (especially in the presence of sheet silicate mineral depressants) are avoided, resulting in a flotation operation that can be more robust and that can be less susceptible to varying performance with moderate changes in feed conditions.

A significant aspect of the present invention is that for enhanced performance, the pH of the slurry during the flotation should be maintained at an acidic pH, typically below pH 6.5, with maintenance of the pH in a range of from pH 3 to pH 6 being more preferred, and maintenance of the pH in a range of from pH 5 to pH 6 being particularly preferred. Because the basic magmatic platinum group metal ores processable by the present invention will typically have a natural pH during flotation that is basic, pH adjustment and control prior to and during flotation is an important consideration. This pH control can be accomplished by adding appropriate quantities of acid (preferably sulfuric acid) prior to and/or during the flotation as needed. This is significantly different than conventional flotation of basic magmatic platinum group metal ores, which are typically conducted at a basic pH.

Many mineral processing operations for processing platinum group metal ores include multiple flotation steps. In the case of platinum group metal primary ores, processing often includes at least rougher, cleaner and scavenger flotation steps to prepare a final platinum group metal concentrate. In the case of platinum group metal by-product ores, processing often includes multiple flotation operations each designed to concentrate a different metal value or values. The present invention will be used in at least one flotation step in which the flotation concentrate is enriched in platinum group metal relative to the feed of ore material to that flotation step.

Conditioning of the slurry prior to flotation can be performed in a single conditioning step or can be performed in multiple conditioning steps performed in any desired sequence. For example, pH adjustment, addition of the lead-containing activator, addition of the collector, and addition of other reagents (such as frother, sheet silicate mineral depressant, etc.) can all be performed in a single conditioning step. Alternatively, one or more of these operations can be performed in separate conditioning steps.

In one embodiment of the present invention, reagent additions are performed in a sequence of conditioning steps prior to flotation. In a first conditioning step, the pH of a slurry of the ore material is adjusted to the desired acidic pH, as discussed above. Following pH adjustment, a second conditioning step involves addition of the lead-containing activator reagent. In a third conditioning step, the xanthate collector reagent is added. When a sheet silicate mineral depressant reagent is added, it is preferably added in a fourth conditioning step following addition of the xanthate collector reagent. Other conditioning steps before, after or in-between the noted conditioning steps can also be included as desired.

With respect to the lead-containing activator reagent, it is often preferred that the lead-containing activator reagent be added during comminution, in addition to or instead of adding the lead-containing activator during a conditioning step. Adding at least a portion of the lead-containing activator reagent during comminution, such as wet milling, advantageously ensures good contact between the lead-containing activator reagent and freshly exposed surfaces of the comminuted ore, in preparation for good interaction with the xanthate collector reagent.

Figure 1:
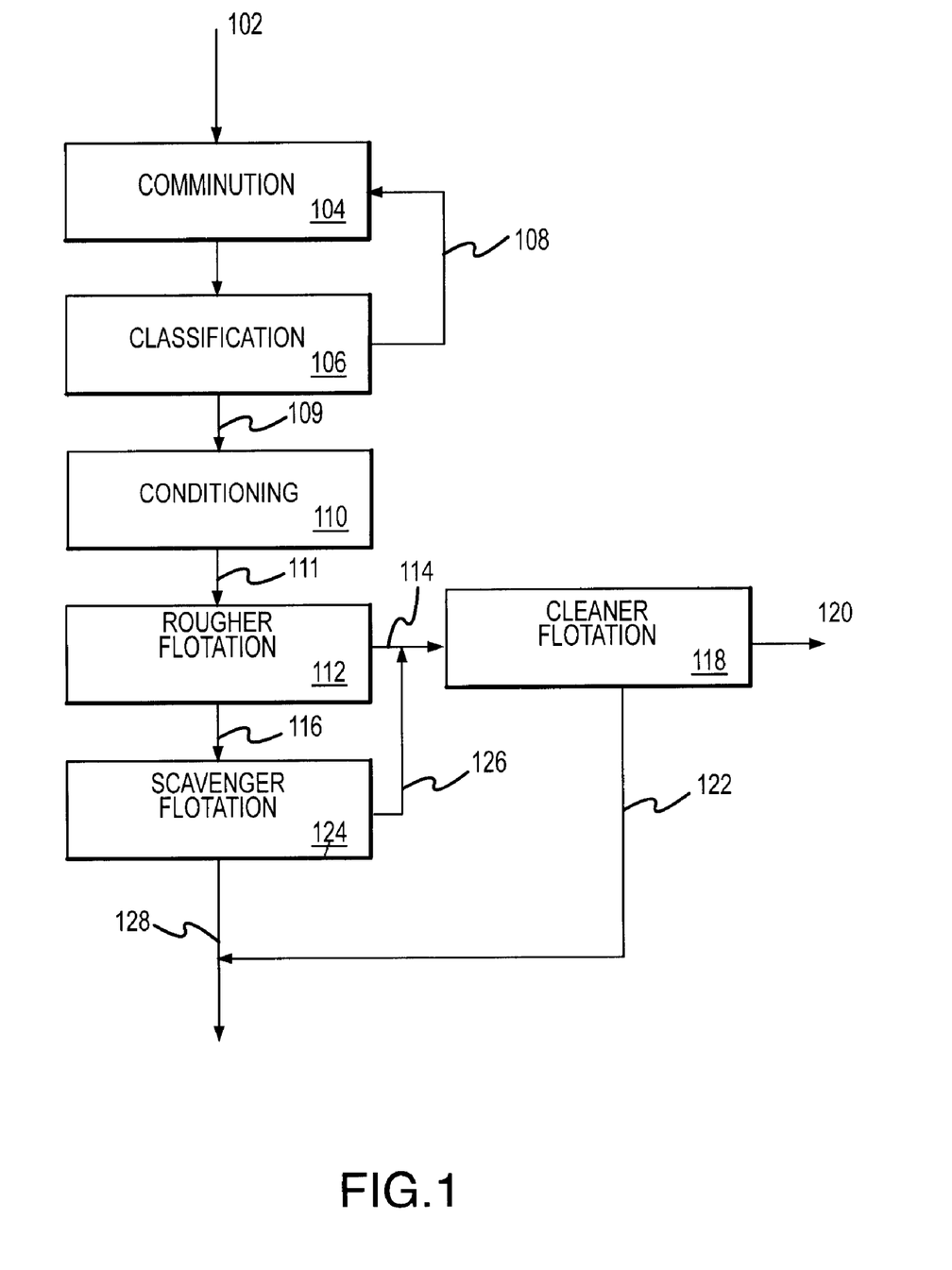
FIG. 1 is a generalized process block diagram showing one example of a flotation operation for implementation of the present invention involving rougher, cleaner and scavenger flotation stages.

Referring now to FIG. 1, a generalized process block diagram is shown for one embodiment of the present invention including one possible arrangement for a rougher-scavenger-cleaner arrangement for a flotation operation for implementation of the present invention, such as might be employed during processing of a platinum group metal primary ore or for preparing an initial bulk concentrate during processing of a platinum group metal by-product ore. As shown in FIG. 1, a coarse ore material 102 is subjected to comminution 104, during which the particle size of the coarse ore material 102 is reduced, such as by grinding and/or milling operations. Typically, the comminution 104 will comprise a wet milling operation. Following the comminution 104, the ore material is subjected to classification 106, during which the ore material is subjected to size classification, and oversize ore material 108 is recycled to the comminution 104 for further size reduction. The classification 106 can be accomplished using any technique separating particles according to size, such as, for example, one or more of screening, and cycloning. Sized ore material 109 is then subjected to conditioning 110. During the conditioning 110, a slurry including the sized ore material 109 is prepared for flotation. The conditioning 110 will often include agitation of the slurry to ensure homogeneity and dispersion of reagents added prior to or during the conditioning 110. The conditioning 110 preferably includes bubbling an oxygen-deficient gas, such as having the properties of the oxygen-deficient flotation gas as previously described, through the slurry that is also preferably mechanically agitated. During the conditioning 110, pH adjustment required prior to flotation is also made, such as by the addition of sulfuric acid to reduce the pH of the slurry to a desired acidic pH for flotation. As will be appreciated, the comminution 104, classification 106 and conditioning 110 can each include multiple steps to effect the desired level of particle size reduction, particle size classification and preparation of the slurry.

Figure 2:
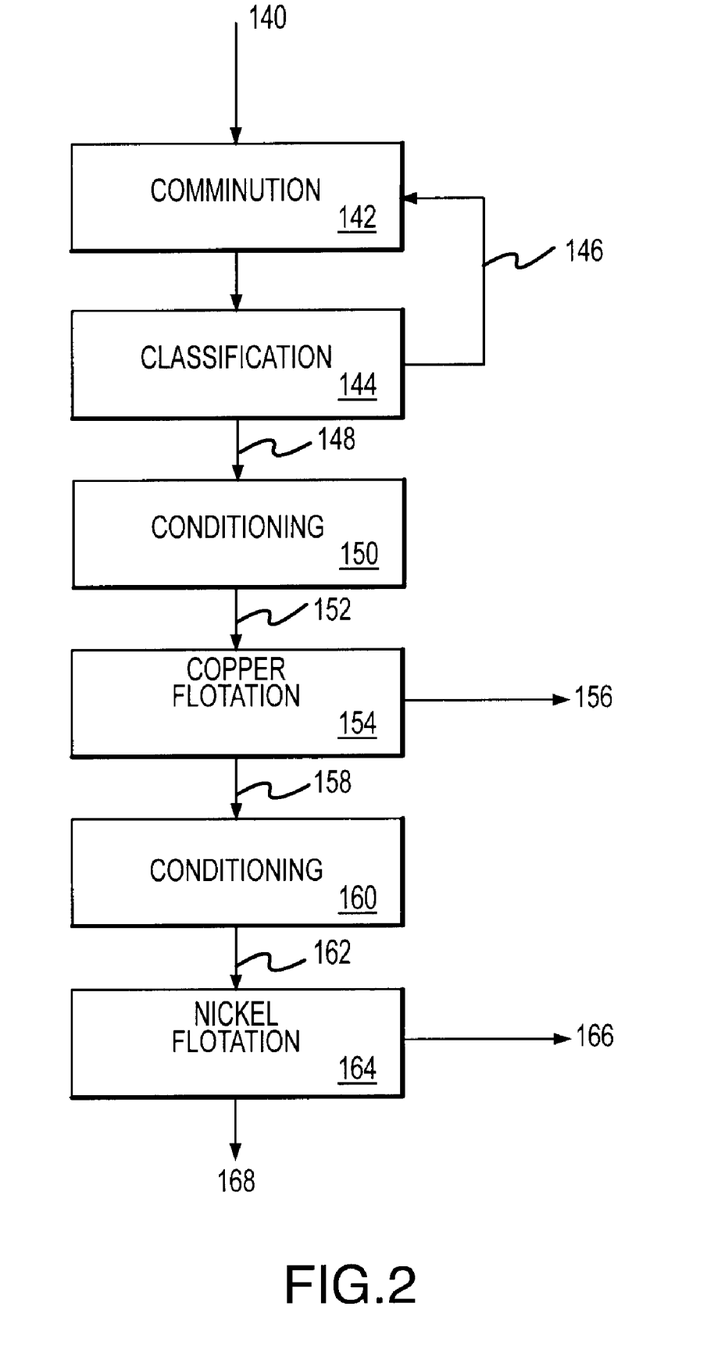
FIG. 2 is a generalized process block diagram showing one example of a flotation operation for implementation of the present invention involving sequential preparation of copper and nickel concentrates.

Following the conditioning 110, a conditioned slurry 111 having the desired characteristics is subjected to rougher flotation 112. During the rougher flotation 112, a flotation gas is bubbled through the slurry contained in one or more flotation vessels with a rougher concentrate 114 being collected from flotation froth at the top of slurry in the vessel(s) and a rougher tail 116 being removed from the bottom of slurry in the vessel(s). The rougher concentrate 114 is enriched in platinum group metal relative to the ore material in the conditioned slurry 111 and the rougher tail 116 is correspondingly depleted in the platinum group metal relative to the ore material in the conditional slurry 111. Also, if the original ore material includes a sheet silicate mineral, the rougher concentrate 114 will be depleted in and the rougher tail 116 will be enriched in the sheet silicate mineral relative to the ore material in the conditioned slurry 111. The rougher concentrate 114 is then subjected to a cleaner flotation 118 to prepare a cleaner concentrate 120 that will typically be more concentrated in platinum group metal than the rougher flotation concentrate 112. The cleaner flotation 118 is performed in a separate flotation vessel or vessels with the cleaner concentrate 120 being collected from flotation froth at the top of the slurry in the vessel(s) during the cleaner flotation 118 and a cleaner tail 122 being withdrawn from the bottom of the slurry in the vessel(s) during the cleaner flotation 118. The rougher tail 116 is subjected to scavenger flotation 124 to recover additional platinum group metal from the rougher flotation tail 116. The scavenger flotation 124 is performed in one or more separate flotation vessels. A scavenger flotation concentrate 126 is collected from flotation froth at the top of the slurry in the vessel(s) during the scavenger flotation and a scavenger tail 128 is collected from the bottom of the slurry in the vessel(s) during the scavenger flotation 124. The scavenger flotation concentrate 126 is combined with the rougher flotation concentrate 114 and processed through the cleaner flotation 118. Any sequence of repulping and conditioning steps can be performed on the rougher concentrate 114 and scavenger concentrate 126 to prepare a slurry for feed to the cleaner flotation 118 having the appropriate slurry density, chemical properties and pH. Furthermore, it might at times be advantageous to further comminute the scavenger flotation concentrate 126, to better liberate platinum group metal for enhanced recovery of platinum group metal during the cleaner flotation 118. The rougher flotation concentrate 114 could also be further comminuted prior to the cleaner flotation 118. Also, the rougher flotation tails 116 can be subjected to any comminution and/or conditioning operations to prepare a slurry having the desired characteristics for the scavenger flotation 124. The rougher concentrate 114, clean concentrate 120 and scavenger concentrate 126 are each enriched in platinum group metals and in sulfide minerals and are depleted in nonsulfide gangue (e.g., sheet silicate minerals) relative to the respective ore material feeds to the rougher flotation 112, cleaner flotation 118 and scavenger flotation 124. The rougher tail 116, cleaner tail 122 and scavenger tail 128 are depleted in platinum group metal and in sulfide minerals and are enriched in nonsulfide gangue (e.g., sheet silicate minerals) relative to the respective feeds of ore materials to the rougher flotation 116, cleaner flotation 118 and scavenger flotation 124. The process flow block diagram shown in FIG. 1, and also the process flow block diagram shown in FIG. 2, is general in nature to show general processing. The process could include additional steps or substeps not shown in the figures. For example any additional comminution, thickening, washing, conditioning or other steps could be added as desired for the particular application.

With continued reference to FIG. 1, at least one of the rougher flotation 112, the cleaner flotation 118 and the scavenger flotation 124 is conducted according to the present invention, using the reagents, flotation gas and flotation conditions described previously. Preferably, at least the rougher flotation 112 is conducted in accordance with the present invention, and more preferably all of the rougher flotation 112, scavenger flotation 124, and cleaner flotation 118 are conducted according to the present invention. Furthermore, it is preferred with the present invention that the entire operation shown in FIG. 1 be conducted in an oxygen-deficient environment, beginning with the comminution 104 and continuing through the scavenger flotation 124 and the cleaner flotation 118. This can be accomplished, for example, by sealing comminution equipment and/or introducing an oxygen-deficient gas into comminution equipment, conducting conditioning operations in sealed tanks with an oxygen-deficient blanketing gas and/or with bubbling of oxygen-deficient gas through the slurry, and performing the rougher flotation 112, scavenger flotation 124 and cleaner flotation 118 in sealed vessels to prevent contamination with air. Furthermore, any other conditioning, comminution or other steps should also be conducted in a sealed environment with the addition of oxygen-deficient process gas as necessary to inhibit contamination by air. Such oxygen-deficient gases used to maintain an oxygen-deficient environment during any of the steps would preferably have a composition consistent with the discussion above concerning the composition of the oxygen-deficient flotation gas used with the present invention.

The processing as shown in FIG. 1 might be used, for example, to process a platinum group metal primary ore or for preparation of a bulk concentrate during processing of a platinum group metal by-product ore. When an operation involves processing of an ore in which platinum group metal is a by-product, then such a bulk concentrate might, for example, be subjected to further flotation operations to prepare concentrates enriched in different metal values. Referring now to FIG. 2, a generalized process block diagram is shown for one possible embodiment of such further processing a bulk concentrate of a magmatic copper/nickel ore containing by-product platinum group metal. A bulk concentrate 140 is subjected to comminution 142, during which the particle size of ore material in the bulk concentrate is reduced, such as through grinding and/or milling operations. During the comminution, nickel-containing minerals (e.g., nickel-containing sulfides, such as for example millerite and/or pentlandite) and copper-containing minerals (e.g., copper-containing sulfides, such as for example chalcopyrite) are better liberated to facilitate selective flotation separation. If desired, reagents can be added during the comminution 142. Following the comminution 142, the bulk concentrate ore material is subjected to classification 144, during which oversize ore material 146 is returned to the comminution 142 for further size reduction and sized ore material 148 is subjected to conditioning 150 to prepare a slurry with desired characteristics for flotation. A feed slurry 152 from the conditioning 150 is then sent to copper flotation 154 where a copper concentrate 156 is collected from flotation froth and a copper flotation tail 158 is removed from the bottom of the slurry and subjected to conditioning 160. During the conditioning 160, the slurry characteristics are modified and reagents added to prepare a feed slurry 162 that is then subjected to nickel flotation 164. During the nickel flotation 164, a nickel concentrate 166 is collected from flotation froth and a nickel flotation tail 168 is withdrawn from the bottom of the slurry. Either the copper concentrate 156 or the nickel concentrate 166 can also be a platinum group metal concentrate, depending upon association of the platinum group metal with copper-containing sulfides and/or nickel-containing sulfides. In copper/nickel ore deposits (e.g., magmatic ore deposits), platinum group metal is often more closely associated with nickel-containing sulfides, particularly pentlandite and also often millerite, and therefore the nickel concentrate 166 is more likely to be enriched in platinum group metal than the copper concentrate 156. Also, it is possible that significant platinum group metal can be retained in the nickel flotation tail 168, such as for example, in association with pyrrhotite or some other iron sulfide. In such a situation, the flotation tail 168 could be further conditioned and subjected to additional flotation for preparation of a sulfide concentrate enriched in the iron sulfide and the associated platinum group metal. Any or all of these flotation steps could potentially benefit from operation according to the present invention.

The present invention is primarily directed to flotation processing of platinum group metal ores, even though those ores may include platinum group metal as a by-product only, and particularly as a by-product of a base metal ore containing significant nonferrous base metal values such as copper and/or nickel. In one aspect, however, the present invention is applicable to flotation of nonferrous base metal sulfide ore materials, and especially when the nonferrous base metal is a copper sulfide and/or nickel sulfide ore material, that have no or commercially insignificant amounts of platinum group metal. For example, the present invention is useful for processing such copper and/or nickel ore materials according to the same principles as discussed herein with respect to the platinum group metal by-product ores that contain copper and/or nickel as the primary metal value(s), with the concentrate prepared by the method of the present invention being a concentrate of the copper and/or nickel base metal. The copper could be contained in chalcopyrite and/or in other copper-containing sulfides and the nickel could be contained in pentlandite and/or millerite and/or other nickel-containing sulfides. Nonlimiting examples of other possible copper-containing sulfides include bornite ($Cu_5FeS_4$), chalcocite ($Cu_2S$), covellite (CuS), digenite ($Cu_{1.8}S$), djurleite ($Cu_{1.97}S$), enargite ($Cu_3AsS_4$), tennantite (($Cu,Fe)_{12}As_4S_{13}$), tetrahedrite ($(Cu,Fe)_{12}Sb_4S_{13}$), anilite ($Cu_{1.75}S$), cubanite ($CuFe_2S_3$), famatinite ($Cu_3SbS_4$), goldfieldite ($Cu_{12}(Te,As)_4S_{13}$), idaite ($Cu_5FeS_6$), luzonite ($Cu_3AsS_4$) and stannite ($Cu_2FeSn_4$). Nonlimiting examples of other possible nickel-containing sulfides include argentopentlandite ($Ag(Fe,Ni)_8S_8$, gersdorffite (NiAsS), heazlewoodite ($Ni_3S2$), mackinawite (($Fe,Ni)_9S_8$), polydymite ($Ni_3S_4$), siegenite ($(Ni,Co)_3S_4$, ullmannite (NiSbS), vaesite (NiS) and violarite ($FeNi_2S_4$). The present invention is also applicable to flotation processing of other base metal ore materials containing significant quantities of nonferrous base metal other than nickel and copper. By nonferrous base metal, it is meant a base metal value other than iron. By nonferrous base metal sulfide ore material, it is meant that the primary metal value in the ore is one or more nonferrous base metal occurring in sulfide mineralization in the ore material. Such nonferrous base metal sulfide ore material will typically contain at least 0.5 weight percent, and preferably at least 1 weight percent of the nonferrous base metal, such as for example of copper and/or nickel. In one embodiment of the present invention, the nonferrous base metal sulfide ore contains sheet silicate mineral, the flotation of which is to be suppressed during the flotation.

One significant aspect of the present invention is that it advantageously accommodates use of recycled process water in the flotation operation. This is because in a preferred embodiment with the present invention, the use of dithiophosphate collectors is avoided, thereby also avoiding complications presented by the presence of residual dithiophosphate in recycled process water. Recycle of processed water when using dithiophosphate collectors is particularly problematic because dithiophosphate is persistent and does not degrade as rapidly as other reagents that may be used. Because of its persistent nature, significant quantities of residual dithiophosphate are often present in recycled water, which can result in a need for the addition of additional reagent materials to counteract effects of the residual dithiophosphate. Such a situation can result in a flotation operation that consumes large quantities of reagents and is also tempermental to system upsets. According to this aspect of the present invention, liquid in the tail slurry from the flotation is separated from the tail and at least a portion of the separated liquid is recycled to upstream of the flotation for reuse to prepare additional feed slurry for flotation. The liquid could, for example, be recycled to a pre-flotation milling or conditioning step. Typically, the separation of the liquid from tailings occurs in a tailing impoundment where tailings are permitted to settle and clarified liquid is withdrawn from the impoundment for recycle.

In one aspect, the present invention provides a method in which following flotation, a platinum group metal concentrate is further processed to recover base metal values (e.g., copper and/or nickel values) and/or platinum group metal values. Because the platinum group metal concentrate will typically include at least a significant quantity of a base metal-containing sulfide, and particularly a nickel-containing sulfide and/or copper-containing sulfide, the platinum group metal concentrate will typically be processed to prepare purified products of one or more platinum group metal and also one or both of copper and nickel. Such further processing to prepare purified metal products can be according to any suitable technique. One example is to subject the platinum group metal concentrate to smelting, followed by metal refining to prepare purified products according to known processes.

EXAMPLES

Samples of two different magmatic platinum group metal primary ores assay for platinum, palladium, sulfur and iron contents as shown in Table 1. Each ore also includes a significant amount of talc. These two ore samples include platinum group metal in platinum group metal minerals and in association with base metal sulfides, particularly with pentlandite.

TABLE 1

| Sample | Pt (g/metric ton) | Pd (g/metric ton) | Fe (wt. %) | S (wt. %) |
|---|---|---|---|---|
| Ore Sample #1 | 2.69 | 11.69 | 2.91 | 0.09 |
| Ore Sample #2 | 3.72 | 15.69 | 3.89 | 0.14 |

Each ore sample is initially crushed to a coarse size of −10 mesh. Various flotation tests are then performed. The flotation test protocol is to mill a 1000 gram sample of the ore to be tested in a laboratory rod mill in a slurry of approximately 50 weight percent solids in water at a milling speed of about 71 revolutions per minute to achieve a desired fine grind of either approximately 60 weight percent passing 200 mesh (74 microns) or 70 weight percent passing 200 mesh (74 microns). The slurry with the milled ore sample is then transferred to a laboratory flotation cell and additional water is added to adjust the slurry density to approximately 35 weight percent solids or less. In the flotation cell, the sample is subjected to a first conditioning sequence for pH adjustment and reagent addition while a gas is bubbled through the slurry (each conditioning procedure identified to as "Cond" in Tables 3–5, 7, 8, 10, 11, 13 and 14.). Following the first conditioning sequence, the sample is subjected to a rougher flotation totaling eight minutes. The rougher flotation is conducted in four two-minute segments, with a rougher flotation concentrate being collected for each two-minute segment (the two-minute rougher flotation segments identified as "Ro1-4" in Tables 3–5, 7, 8, 10, 11, 13 and 14). At the end of each two minute rougher flotation segment, the flotation gas is turned off and remaining froth is removed from the top of the slurry. Bubbling of the flotation gas is then commenced to start the next two-minute rougher flotation segment. Following the rougher flotation, the remaining slurry is subjected to a second conditioning sequence with reagent addition while bubbling gas through the slurry. Following the second conditioning sequence, the slurry is subjected to a scavenger flotation for eight minutes, conducted in two four-minute segments with collection of a scavenger concentrate for each four-minute segment (the four-minute scavenger flotation segments identified as "Scav1–2" in Tables 3–5, 7, 8, 10, 11, 13 and 14). Therefore, each test involves 16 minutes of flotation (eight minutes of rougher flotation and eight minutes of scavenger flotation). The flotation gas bubbled through the slurry during the rougher flotation and the scavenger flotation is either air or industrial grade nitrogen gas. Frother reagent is added as needed to maintain good froth characteristics during the rougher and scavenger flotations. Sulfuric acid is added as needed for pH control. The same gas used for flotation is bubbled through the slurries during conditioning steps. For tests involving nitrogen gas flotation, nitrogen gas is flushed through the rod mill during the milling operation, so that each step of the nitrogen gas tests is performed in an environment that is in the absence of the oxygen gas normally present in air. Chemical reagents used in the various tests are listed in Table 2.

TABLE 2

| REAGENT | FUNCTION | DESCRIPTION |
|---|---|---|
| PAX | collector | potassium amyl xanthate |
| A3477 | collector | sodium diisobutyl dithiophosphate (AERO ™ 3477, Cytec Industries, Inc. |
| CMC | talc depressant | carboxymethylcellulose |
| MIBC | frother | methyl isobutyl carbinol |
| $Pb(NO_3)_2$ | activator | lead nitrate |
| DF250 | frother | polypropylene glycol methyl ether (DOWFROTH ™ 250, Dow Chemical Company) |

Example 1

Tests 1–3 are performed using ore sample #1. The conditions for each test are shown in Tables 3–5. Eh is measured relative to a Ag—Ag/Cl⁻ electrode using a platinum working electrode.

TABLE 3

Test 1 Conditions

Reagent Additions - Kg reagent/metric ton ore

| Stage | PAX | A3477 | CMC | MIBC | Pb(NO$_3$)$_2$ | DF250 | Time-Min | pH | Eh-mV | Gas |
|---|---|---|---|---|---|---|---|---|---|---|
| Milling | 0.045 | 0.035 | | | | | 18 | 9.5 | −45 | air |
| Cond | | | | | | | 1 | 9.5 | | air |
| Cond | 0.045 | 0.035 | 0.25 | 0.012 | | | 2 | 9.5 | −95 | air |
| Cond | | | | | | | 2 | 7.8 | −132 | air |
| Ro1 | | | | 0.004 | | | 2 | 7.8 | −121 | air |
| Ro2 | | | | 0.004 | | | 2 | 7.8 | −119 | air |
| Ro3 | | | | 0.004 | | | 2 | 7.8 | −112 | air |
| Ro4 | | | | | | | 2 | 7.8 | −105 | air |
| Cond | 0.035 | 0.030 | | | | | 2 | 7.8 | −129 | air |
| Scav1 | | | | | | | 4 | 7.8 | −109 | air |
| Scav2 | | | | 0.004 | | | 4 | 7.8 | −102 | air |
| Total | 0.125 | 0.1 | 0.25 | 0.028 | | | | | | |

TABLE 4

Test 2 Conditions

Reagent Additions - Kg reagent/metric ton ore

| Stage | PAX | A3477 | CMC | MIBC | Pb(NO$_3$)$_2$ | DF250 | Time-Min | pH | Eh-mV | Gas |
|---|---|---|---|---|---|---|---|---|---|---|
| Milling | 0.045 | 0.035 | | | | | 18 | 9.4 | −100 | N$_2$ |
| Cond | | | | | | | 5 | 5.5 | −275 | N$_2$ |
| Cond | | | | | 0.05 | | 5 | 5.5 | −300 | N$_2$ |
| Cond | 0.045 | 0.035 | 0.15 | | | | 2 | 5.5 | −288 | N$_2$ |
| Ro1 | | | | 0.02 | | 0.006 | 2 | 5.5 | −288 | N$_2$ |
| Ro2 | | | | 0.004 | | | 2 | 5.5 | −240 | N$_2$ |
| Ro3 | | | 0.10 | 0.008 | | | 2 | 5.5 | −218 | N$_2$ |
| Ro4 | | | | 0.008 | | | 2 | 5.5 | −207 | N$_2$ |
| Cond | | | | | 0.025 | | 2 | 5.5 | −158 | N$_2$ |
| Cond | 0.035 | 0.030 | | | | | 2 | 5.5 | −175 | N$_2$ |
| Scav1 | | | | | | | 4 | 5.5 | −158- | N$_2$ |
| Scav2 | | | | | | | 6 | 5.5 | −144 | N$_2$ |
| Total | 0.125 | 0.1 | 0.25 | 0.04 | 0.075 | 0.006 | | | | |

TABLE 5

Test 3 Conditions

Reagent Additions - Kg reagent/metric ton ore

| Stage | PAX | A3477 | CMC | MIBC | Pb(NO$_3$)$_2$ | DF250 | Time-Min | pH | Eh-mV | Gas |
|---|---|---|---|---|---|---|---|---|---|---|
| Milling | | | | | | | 18 | 9.3 | −30 | N$_2$ |
| Cond | | | | | | | 5 | 5.5 | −250 | N$_2$ |
| Cond | | | | | 0.05 | | 3 | 5.5 | −363 | N$_2$ |
| Cond | 0.05 | | | | | | 3 | 5.5 | −360 | N$_2$ |
| Cond | | | 0.15 | | | | 1 | 5.5 | −360 | N$_2$ |
| Ro1 | | | | 0.02 | | 0.032 | 2 | 5.5 | −348 | N$_2$ |
| Ro2 | 0.05 | | | | | 0.008 | 2 | 5.5 | −358 | N$_2$ |
| Ro3 | | | | | | | 2 | 5.5 | −341 | N$_2$ |
| Ro4 | | | | | | 0.008 | 2 | 5.5 | −320 | N$_2$ |
| Cond | | | | | 0.025 | 0.008 | 2 | 5.5 | −202 | N$_2$ |
| Cond | 0.05 | | | | | | 2 | 5.5 | −226 | N$_2$ |
| Scav2 | | | | | | | 4 | 5.5 | −221 | N$_2$ |
| Scav2 | | | | | | | 4 | 5.5 | −212 | N$_2$ |
| Total | 0.15 | | 0.15 | 0.02 | 0.075 | 0.056 | | | | |

During the milling, the ore samples are milled to a size of 70 weight percent passing 200 mesh (70 weight percent passing 74 microns). Results are summarized in Table 6, where cumulative weight recovery of concentrate and cumulative percent recoveries of platinum and palladium are shown at the end of each flotation segment. For example, data presented for Ro1 represent recoveries in the first rougher segment, data for Ro1-Ro2 represent cumulative recoveries through the second rougher segment, etc. Data for Ro1-Scav2 represent cumulative recoveries for all flotation segments (i.e., from the first rougher flotation segment through the second scavenger flotation segment). As seen in Table 6, Tests 2 and 3, which each use conditions of the present invention, recover a higher percentage of palladium, while maintaining a high recovery of platinum. In particular, platinum and palladium recoveries in Test 3 are high, even though the flotation is conducted without the dithiophosphate collector (A3477) and with significantly smaller additions of CMC and MIBC. Notably, kinetics of flotation of palladium are also improved in Test 2 relative to Test 1, and are even more significantly improved in Test 3. This is shown by the relatively higher recovery of palladium in the rougher flotation segments, and particularly in the earlier rougher flotation segments. In Test 3, the kinetics of the platinum flotation is also somewhat improved. Improved kinetics are important, because with improved kinetics of flotation, flotation times can generally be shortened, while still obtaining high recoveries.

TABLE 6

| Test | Concentrate Product | Wt. Recovery (wt. %) | Pt Recovery (%) | Pd Recovery (%) |
|---|---|---|---|---|
| 1 | Ro1 | 1.85 | 88.90 | 80.96 |
|   | Ro1-Ro2 | 3.48 | 92.60 | 86.41 |
|   | Ro1-Ro3 | 4.81 | 93.95 | 88.70 |
|   | Ro1-Ro4 | 5.74 | 95.12 | 90.32 |
|   | Ro1-Scav1 | 7.34 | 95.97 | 92.19 |
|   | Ro1-Scav2 (Total Concentrate) | 8.45 | 96.36 | 93.23 |
| 2 | Ro1 | 2.99 | 80.79 | 83.89 |
|   | Ro1-Ro2 | 5.00 | 91.63 | 88.19 |
|   | Ro1-Ro3 | 6.01 | 93.93 | 92.91 |
|   | Ro1-Ro4 | 7.00 | 95.18 | 94.01 |
|   | Ro1-Scav1 | 8.84 | 95.94 | 94.93 |
|   | Ro1-Scav2 (Total Concentrate) | 9.85 | 96.51 | 95.44 |
| 3 | Ro1 | 2.07 | 89.19 | 85.13 |
|   | Ro1-Ro2 | 3.99 | 93.83 | 90.73 |
|   | Ro1-Ro3 | 5.53 | 95.09 | 92.41 |
|   | Ro1-Ro4 | 6.77 | 95.79 | 93.37 |
|   | Ro1-Scav1 | 8.31 | 96.38 | 94.30 |
|   | Ro1-Scav2 (Total Concentrate) | 9.48 | 96.77 | 94.88 |

Example 2

Tests 4&5 are performed using ore sample #1. The conditions for each test are shown in Tables 7&8.

TABLE 7

Test 4 Conditions

Reagent Additions - Kg reagent/metric ton ore

| Stage | PAX | A3477 | CMC | MIBC | $Pb(NO_3)_2$ | DF250 | Time-Min | pH | Eh-mV | Gas |
|---|---|---|---|---|---|---|---|---|---|---|
| Milling | 0.045 | 0.035 |  |  |  |  | 15 | 9.2 | −44 | air |
| Cond |  |  |  |  |  |  | 1 | 9.2 | −47 | air |
| Cond | 0.045 | 0.035 | 0.25 |  |  |  | 2 | 9.2 | −79 | air |
| Cond |  |  |  |  |  |  | 2 | 7.8 | −91 | air |
| Ro1 |  |  |  |  |  |  | 2 | 7.8 | −94 | air |
| Ro2 |  |  |  | 0.004 |  |  | 2 | 7.8 | −91 | air |
| Ro3 |  |  |  | 0.008 |  |  | 2 | 7.8 | −88 | air |
| Ro4 |  |  |  |  |  |  | 2 | 7.8 | −88 | air |
| Cond | 0.035 | 0.03 |  |  |  |  | 2 | 7.8 | −105 | air |
| Scav1 |  |  |  |  |  |  | 4 | 7.8 | −99 | air |
| Scav2 |  |  |  |  |  |  | 4 | 7.8 | −94 | air |
| Total | 0.125 | 0.1 | 0.25 | 0.012 |  |  |  |  |  |  |

TABLE 8

Test 5 Conditions

Reagent Additions - Kg reagent/metric ton ore

| Stage | PAX | A3477 | CMC | MIBC | $Pb(NO_3)_2$ | DF250 | Time-Min | pH | Eh-mV | Gas |
|---|---|---|---|---|---|---|---|---|---|---|
| Milling |  |  |  |  |  |  | 15 | 9.1 | −231 | $N_2$ |
| Cond |  |  |  |  | 0.05 |  | 5 | 5.5 | −501 | $N_2$ |
| Cond |  |  |  |  |  |  | 3 | 5.5 | −521 | $N_2$ |
| Cond | 0.01 |  |  |  |  |  | 1 | 5.5 | −492 | $N_2$ |
| Cond |  |  | 0.25 |  |  |  | 1 | 5.5 | −446 | $N_2$ |
| Ro1 |  |  |  |  |  | 0.04 | 2 | 5.5 | −445 | $N_2$ |
| Ro2 | 0.03 |  |  |  |  | 0.02 | 2 | 5.5 | −422 | $N_2$ |
| Ro3 | 0.03 |  |  |  |  | 0.012 | 2 | 5.5 | −370 | $N_2$ |
| Ro4 | 0.02 |  |  |  |  | 0.008 | 2 | 5.5 | −350 | $N_2$ |
| Cond |  |  |  |  | 0.025 |  | 2 | 5.5 | −277 | $N_2$ |
| Cond | 0.05 |  |  |  |  |  | 2 | 5.5 | −273 | $N_2$ |

TABLE 8-continued

Test 5 Conditions

Reagent Additions - Kg reagent/metric ton ore

| Stage | PAX | A3477 | CMC | MIBC | Pb(NO$_3$)$_2$ | DF250 | Time-Min | pH | Eh-mV | Gas |
|---|---|---|---|---|---|---|---|---|---|---|
| Scav1 | | | | | | 0.008 | 4 | 5.5 | −249 | N$_2$ |
| Scav2 | | | | | | 0.008 | 4 | 5.5 | −222 | N$_2$ |
| Total | 0.14 | | 0.25 | | 0.075 | 0.096 | | | | |

During the milling, the ore samples are milled to a size of 60 weight percent passing 200 mesh (60 weight percent passing 74 rmicrons). Results are summarized in Table 9. As shown in Table 9, both platinum and palladium recoveries are higher in Test 5 using the present invention than in Test 4, not conducted according to the present invention, and this is achieved without the use of the dithiophosphate collector (A3477). Also, the flotation kinetics are significantly faster for both platinum and palladium in Test 5 than in Test 4.

TABLE 9

| Test | Concentrate Product | Wt. Recovery (wt. %) | Pt Recovery (%) | Pd Recovery (%) |
|---|---|---|---|---|
| 4 | Ro1 | 1.26 | 82.14 | 77.05 |
| | Ro1-Ro2 | 2.14 | 91.85 | 86.88 |
| | Ro1-Ro3 | 3.26 | 93.50 | 89.20 |
| | Ro1-Ro4 | 4.47 | 94.46 | 90.59 |
| | Ro1-Scav1 | 6.36 | 95.68 | 92.83 |
| | Ro1-Scav2 (Total Concentrate) | 7.73 | 96.41 | 93.91 |
| 5 | Ro1 | 1.21 | 85.17 | 82.93 |
| | Ro1-Ro2 | 2.82 | 94.03 | 91.03 |
| | Ro1-Ro3 | 4.21 | 95.66 | 93.01 |
| | Ro1-Ro4 | 5.42 | 96.27 | 93.92 |
| | Ro1-Scav1 | 7.30 | 96.89 | 94.86 |
| | Ro1-Scav2 (Total Concentrate) | 8.51 | 97.30 | 95.40 |

Example 3

Tests 6&7 are performed using ore sample #2. The conditions for each test are shown in Tables 10&11.

TABLE 10

Test 6 Conditions

Reagent Additions - Kg reagent/metric ton ore

| Stage | PAX | A3477 | CMC | MIBC | Pb(NO$_3$)$_2$ | DF250 | Time-Min | pH | Eh-mV | Gas |
|---|---|---|---|---|---|---|---|---|---|---|
| Milling | 0.045 | 0.035 | | | | | 18 | 9.3 | −88 | |
| Cond | | | | | | | 1 | 9.3 | −80 | air |
| Cond | | | | | | | 2 | 9.3 | −102 | air |
| Cond | 0.045 | 0.035 | 0.25 | | | | 2 | 7.8 | −106 | air |
| Ro1 | | | | | | | 2 | 7.8 | −104 | air |
| Ro2 | | | | | | | 2 | 7.8 | −96 | air |
| Ro3 | | | | 0.10 | | 0.008 | 2 | 7.8 | −84 | air |
| Ro4 | | | | | | 0.008 | 2 | 7.8 | | air |
| Cond | 0.035 | 0.03 | | | | | 2 | 7.8 | −121 | air |
| Scav1 | | | | | | | 4 | 7.8 | −110 | air |
| Scav2 | | | | | | | 4 | 7.8 | −102 | air |
| Total | 0.125 | 0.1 | 0.35 | | | 0.016 | | | | |

TABLE 11

Test 7 Conditions

Reagent Additions - Kg reagent/metric ton ore

| Stage | PAX | A3477 | CMC | MIBC | Pb(NO$_3$)$_2$ | DF250 | Time-Min | pH | Eh-mV | Gas |
|---|---|---|---|---|---|---|---|---|---|---|
| Milling | | | | | | | 18 | 9.3 | −88 | N$_2$ |
| Cond | | | | | | | 5 | 5.5 | −450 | N$_2$ |
| Cond | | | | | 0.05 | | 3 | 5.5 | −515 | N$_2$ |
| Cond | 0.01 | | | 0.04 | | | 1 | 5.5 | −470 | N$_2$ |
| Cond | | | 0.1 | | | | 1 | 5.5 | −470 | N$_2$ |

TABLE 11-continued

Test 7 Conditions

Reagent Additions - Kg reagent/metric ton ore

| Stage | PAX | A3477 | CMC | MIBC | Pb(NO$_3$)$_2$ | DF250 | Time-Min | pH | Eh-mV | Gas |
|---|---|---|---|---|---|---|---|---|---|---|
| Ro1 | | | | 0.02 | | 0.08 | 2 | 5.5 | −470 | N$_2$ |
| Ro2 | 0.03 | | | 0.008 | | 0.004 | 2 | 5.5 | −385 | N$_2$ |
| Ro3 | 0.03 | | | 0.008 | | 0.004 | 2 | 5.5 | −348 | N$_2$ |
| Ro4 | 0.02 | | | 0.008 | | | 2 | 5.5 | −313 | N$_2$ |
| Cond | | | | | 0.025 | | 2 | 5.5 | −253 | N$_2$ |
| Cond | 0.05 | | | | | | 2 | 5.5 | −283 | N$_2$ |
| Scav1 | | | | 0.008 | | | 4 | 5.5 | −262 | N$_2$ |
| Scav2 | | | | 0.008 | | | 4 | 5.5 | −249 | N$_2$ |
| Total | 0.14 | | 0.1 | 0.1 | 0.075 | 0.016 | | | | |

During the milling, the ore samples are milled to a size of 72 weight percent passing 200 mesh (72 weight percent passing 74 microns). Results are summarized in Table 12. As shown in Table 12, both platinum and palladium recoveries are higher in Test 7, conducted according to the present invention, than in Test 6, not conducted according to the present invention. Kinetics of flotation are also generally higher for both platinum and palladium in Test 7 than in Test 6.

TABLE 12

| Test | Concentrate Product | Wt. Recovery (wt. %) | Pt Recovery (%) | Pd Recovery (%) |
|---|---|---|---|---|
| 6 | Ro1 | 2.09 | 86.26 | 77.46 |
| | Ro1-Ro2 | 3.03 | 90.38 | 82.79 |
| | Ro1-Ro3 | 3.76 | 91.75 | 84.48 |
| | Ro1-Ro4 | 4.49 | 92.52 | 85.61 |
| | Ro1-Scav1 | 5.95 | 94.00 | 88.25 |
| | Ro1-Scav2 (Total Concentrate) | 6.58 | 94.71 | 89.57 |

TABLE 12-continued

| Test | Concentrate Product | Wt. Recovery (wt. %) | Pt Recovery (%) | Pd Recovery (%) |
|---|---|---|---|---|
| 7 | Ro1 | 2.49 | 82.13 | 77.16 |
| | Ro1-Ro2 | 5.17 | 92.16 | 87.13 |
| | Ro1-Ro3 | 7.04 | 93.99 | 89.53 |
| | Ro1-Ro4 | 8.54 | 94.95 | 90.96 |
| | Ro1-Scav1 | 10.09 | 95.87 | 92.45 |
| | Ro1-Scav2 (Total Concentrate) | 11.61 | 96.48 | 93.47 |

Example 4

Tests 8 & 9 are performed using ore sample #2. The conditions for each test are shown in Tables 13 & 14.

TABLE 13

Test 8 Conditions

Reagent Additions - Kg reagent/metric ton ore

| Stage | PAX | A3477 | CMC | MIBC | Pb(NO$_3$)$_2$ | DF250 | Time-Min | pH | Eh-mV | Gas |
|---|---|---|---|---|---|---|---|---|---|---|
| Milling | 0.045 | 0.035 | | | | | 15 | 9.1 | −59 | air |
| Cond | | | | | | | 1 | 9.2 | | air |
| Cond | 0.045 | 0.035 | 0.25 | | | | 2 | 9.2 | −102 | air |
| Cond | | | | | | | 2 | 7.8 | −120 | air |
| Ro1 | | | | 0.008 | | | 2 | 7.8 | −150 | air |
| Ro2 | | | | 0.008 | | | 2 | 7.8 | −104 | air |
| Ro3 | | | | 0.004 | | | 2 | 7.8 | −93 | air |
| Ro4 | | | | 0.004 | | | 2 | 7.8 | −91 | air |
| Cond | 0.035 | 0.03 | | | | | 2 | 7.8 | −123 | air |
| Scav1 | | | | | | | 4 | 7.8 | −103 | air |
| Scav2 | | | | 0.004 | | | 4 | 7.8 | −93 | air |
| Total | 0.125 | 0.1 | 0.25 | 0.028 | | | | | | |

TABLE 14

Test 9 Conditions

Reagent Additions - Kg reagent/metric ton ore

| Stage | PAX | A3477 | CMC | MIBC | Pb(NO$_3$)$_2$ | DF250 | Time-Min | pH | Eh-mV | Gas |
|---|---|---|---|---|---|---|---|---|---|---|
| Milling | | | | | | | 15 | 9.2 | −142 | N$_2$ |
| Cond | | | | | | | 5 | 5.5 | −460 | N$_2$ |
| Cond | | | | 0.05 | | | 3 | 5.5 | −477 | N$_2$ |
| Cond | 0.01 | | | | | | 1 | 5.5 | −457 | N$_2$ |
| Cond | | | 0.25 | | | | 1 | 5.5 | −458 | N$_2$ |
| Ro1 | | | | | 0.008 | 0.048 | 2 | 5.5 | −448 | N$_2$ |
| Ro2 | 0.03 | | | | | 0.02 | 2 | 5.5 | −398 | N$_2$ |
| Ro3 | 0.03 | | | | | 0.012 | 2 | 5.5 | −301 | N$_2$ |
| Ro4 | 0.02 | | | | | 0.008 | 2 | 5.5 | −268 | N$_2$ |
| Cond | | | | | 0.025 | | 2 | 5.5 | −267 | N$_2$ |
| Cond | 0.05 | | | | | | 2 | 5.5 | −258 | N$_2$ |
| Scav1 | | | | | | 0.008 | 4 | 5.5 | −224 | N$_2$ |
| Scav2 | | | | | | 0.008 | 4 | 5.5 | −211 | N$_2$ |
| Total | 0.14 | | 0.25 | 0.008 | 0.075 | 0.104 | | | | |

During the milling, the ore samples are milled to a size of 60 weight percent passing 200 mesh (60 weight percent passing 74 microns). Results are summarized in Table 15. As shown in Table 15, platinum and palladium recoveries are higher in Test 9, conducted according to the present invention, than in Test 8, not conducted according to the present invention. Flotation kinetics for both platinum and palladium are significantly improved in Test 9 compared to Test 8.

TABLE 15

| Test | Concentrate Product | Wt. Recovery (wt. %) | Pt Recovery (%) | Pd Recovery (%) |
|---|---|---|---|---|
| 8 | Ro1 | 1.56 | 81.70 | 73.98 |
| | Ro1-Ro2 | 3.04 | 89.14 | 82.57 |
| | Ro1-Ro3 | 9.98 | 91.08 | 85.12 |
| | Ro1-Ro4 | 4.79 | 91.99 | 86.71 |
| | Ro1-Scav1 | 6.34 | 93.86 | 89.64 |
| | Ro1-Scav2 (Total Concentrate) | 7.39 | 94.64 | 90.98 |
| 9 | Ro1 | 2.33 | 84.46 | 81.07 |
| | Ro1-Ro2 | 4.61 | 91.74 | 88.13 |
| | Ro1-Ro3 | 6.27 | 93.36 | 90.24 |
| | Ro1-Ro4 | 7.43 | 94.39 | 91.39 |
| | Ro1-Scav1 | 9.41 | 95.21 | 92.79 |
| | Ro1-Scav2 (Total Concentrate) | 10.91 | 95.80 | 93.59 |

The foregoing discussion of the invention has been presented for purposes of illustration and description. The foregoing is not intended to limit the invention to only the form or forms specifically disclosed herein. Although the description of the invention has included description of one or more embodiments and certain variations and modifications, other variations and modifications are within the scope of the invention, e.g., as may be within the skill and knowledge of those in the art after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. Furthermore, any feature described with respect to any disclosed embodiment may be combined in any combination with one or more features of any other embodiment or embodiments. For example, additional processing steps can be included at any point during or after processing disclosed in any of the process embodiments described herein or shown in any of the figures, so long as the additional steps are not incompatible with the disclosed processing according to the present invention. Moreover, processing steps disclosed in any of the process embodiments described herein or shown in any of the figures can be combined with any other processing steps disclosed in any of the other figures.

The terms "comprising", "containing", "including" and "having", and variations thereof, are intended to be nonlimiting in that the use of such terms indicates the presence of some condition or feature, but not to the exclusion of the presence of any other condition or feature.

What is claimed is:

1. A method for flotation processing a platinum group metal ore material to prepare a platinum group metal concentrate, the method comprising:
    flotation of a feed of the ore material to produce a flotation concentrate enriched in platinum group metal relative to the feed of the ore material and to produce a flotation tail depleted in platinum group metal relative to the feed of the ore material, the flotation comprising introducing a flotation gas into a slurry containing the ore material in particulate form, with the flotation concentrate being collected from froth at the top of the slurry; the flotation gas being selected from the group consisting of a gas composition essentially free of oxygen gas and a gas composition comprising no more that 15 volume percent oxygen gas; and
    prior to or during the flotation, adding to the ore material at least a collector reagent and a lead-containing activator reagent.

2. The method of claim 1, wherein the collector reagent is a xanthate collector reagent.

3. The method of claim 1, wherein the lead-containing activator reagent is a lead salt selected from the group consisting of lead nitrate, lead acetate and lead carbonate.

4. The method of claim 1, wherein the lead-containing activator reagent is litharge.

5. The method of claim 1, comprising, prior to or during the flotation, adding a frother reagent to the ore material.

6. The method of claim 5, wherein the frother reagent is an organic material.

7. The method of claim 6, wherein the frother reagent is an alcohol.

8. The method of claim 7, wherein the frother reagent is methylisobutyl carbinol.

9. The method of claim 6, wherein the frother reagent is glycol-based.

10. The method of claim 6, wherein prior to and during the flotation a total of from about 5 to 50 grams of the frother reagent is added to the ore material per metric ton of the feed of the ore material.

11. The method of claim 1, wherein the feed of the ore material comprises a sheet silicate mineral having a natural tendency to float during flotation, and prior to or during the flotation a depressant reagent is added to inhibit floating of the sheet silicate mineral during the flotation.

12. The method of claim 11, wherein the sheet silicate mineral comprises at least one of talc and a talcose mineral.

13. The method of claim 11, wherein the sheet silicate mineral comprises talc.

14. The method of claim 11, wherein in the sheet silicate mineral comprises serpentine.

15. The method of claim 11, wherein the depressant reagent comprises a polysaccharide-based material.

16. The method of claim 11 wherein the depressant reagent comprises a cellulosic material.

17. The method of claim 16, wherein the cellulosic material is carboxymethylcellulose.

18. The method of claim 11 wherein the depressant reagent comprises a starch-based material.

19. The method of claim 18, wherein the starch-based material is a dextrin.

20. The method of claim 1, comprising, after the flotation, separating aqueous liquid of the slurry from solids of the slurry and recycling back to the flotation at least a portion of the aqueous liquid to prepare slurry of additional ore material for the flotation.

21. The method of claim 20, wherein during the flotation, the slurry is substantially free of a dithiophosphate collector.

22. The method of claim 1 comprising, after the flotation, processing the concentrate to separate the platinum group metal from other components in the concentrate to prepare a purified product.

23. The method of claim 22, wherein the processing comprises smelting the flotation concentrate.

24. The method of claim 1, wherein the feed of the ore material comprises a base metal sulfide mineral with which at least a portion of the platinum group metal is associated and the flotation concentrate is enriched in the base metal sulfide mineral relative to the feed of the ore material.

25. The method of claim 24, wherein the base metal sulfide mineral comprises copper-containing sulfide.

26. The method of claim 25 wherein the copper-containing sulfide comprises chalcopyrite.

27. The method of claim 24, wherein the base metal sulfide mineral comprises nickel-containing sulfide.

28. The method of claim 27, wherein the nickel-containing sulfide comprises pentlandite.

29. The method of claim 27, wherein the flotation concentrate comprises at least 1 weight percent nickel.

30. The method of claim 1, wherein the feed of the ore material comprises a base metal sulfide with which at least a portion of the platinum group metal is associated, the base metal sulfide comprising a base metal selected from the group consisting of copper, nickel and combinations thereof; and the flotation concentrate is concentrated in the base metal relative to the feed and the flotation tail is depleted in the base metal relative to the feed.

31. The method of claim 30, wherein the flotation concentrate comprises at least 2 weight percent of the base metal.

32. The method of claim 31, wherein the flotation concentrate comprises at least 30 grams per metric ton of the platinum group metal.

33. The method of claim 1, wherein the flotation gas comprises at least 90 volume percent of nitrogen gas.

34. The method of claim 1, wherein the flotation gas comprises at least 95 volume percent of nitrogen gas.

35. The method of claim 1, wherein during the flotation the slurry is maintained at an acidic pH of no higher than pH 6.5.

36. The method of claim 1, wherein during the flotation the pH of the slurry is maintained in a range of from pH 3 to pH 6.

37. The method of claim 1, wherein the concentrate comprises at least 30 grams per metric ton of platinum group metal selected from the group consisting of platinum, palladium and combinations thereof.

38. The method of claim 1, wherein the collector reagent is a xanthate collector reagent selected from the group consisting of potassium ethyl xanthate, potassium amyl xanthate, sodium isobutyl xanthate, and sodium isopropyl xanthate.

39. A method for flotation processing a platinum group metal ore material including a sheet silicate mineral having a natural tendency to float during flotation processing to prepare a platinum group metal concentrate, the method comprising:

flotation of a feed of the ore material to produce a flotation concentrate enriched in platinum group metal and depleted in the sheet silicate mineral relative to the feed of the ore material and to produce a flotation tail enriched in the sheet silicate mineral component and depleted in platinum group metal relative to the feed of the ore material, the flotation comprising bubbling a flotation gas through an aqueous liquid slurry of the ore material in particulate form, with the flotation concentrate being collected from froth at the top of the slurry;

the flotation gas being selected from the group consisting of a gas essentially free of oxygen gas and a gas comprising no more that 15 volume percent oxygen gas; and prior to or during the flotation, adding to the ore material flotation reagents comprising at least a xanthate collector reagent, a lead-containing activator reagent, a frother reagent and a depressant reagent; and wherein, the depressant reagent is an organic material having an effect of suppressing floating of the sheet silicate mineral during the flotation.

40. The method of claim 39, comprising prior to the flotation, conditioning feed slurry containing the feed of the ore, the conditioning comprising reducing the pH of the feed slurry from a basic pH to a pH in a range from pH 3 to pH 6.

41. The method of claim 40, wherein process gas is bubbled through the feed slurry during each of the first conditioning and the second conditioning, the process gas selected from the group consisting of a gas composition essentially free of oxygen gas and a gas composition comprising no more than 15 volume percent oxygen gas.

42. The method of claim 40, comprising prior to the flotation, conditioning a feed slurry containing the feed of the ore material, the conditioning comprising reducing Eh of the slurry from a level above −150 mV to a level no higher than −150 mV, as measured against a platinum electrode relative to a silver/silver chloride reference.

43. The method of claim 39, wherein the depressant is a cellulosic material.

44. The method of claim 43, wherein the depressant is carboxymethylcellulose.

45. The method of claim 39, wherein the depressant is a starch-based material.

46. The method of claim 45, wherein the depressant is a dextrin.

47. A method for flotation processing a nonferrous base metal sulfide ore material including nonferrous base metal to prepare a nonferrous base metal sulfide concentrate, the method comprising:

flotation of a feed of the ore material to produce a flotation concentrate enriched in the nonferrous base metal relative to the feed of the ore material and to produce a flotation tail depleted in the nonferrous base metal relative to the feed of the ore material, the flotation comprising introducing a flotation gas into a slurry containing the ore material in particulate form, with the flotation concentrate being collected from froth at the top of the slurry;

the flotation gas being selected from the group consisting of a gas composition essentially free of oxygen gas and a gas composition comprising no more that 15 volume percent oxygen gas; and prior to or during the flotation, adding to the ore material at least a collector reagent and a lead-containing activator reagent.

48. The method of claim 47, wherein the nonferrous base metal is selected from the group consisting of copper, nickel and combinations thereof.

49. The method of claim 48, wherein the feed of the ore material comprised at least 0.5 weight percent of the nonferrous base metal.

50. The method of claim 49, wherein the feed of the ore material comprises at least 0.5 weight percent of nickel in one or more of nickel-containing sulfide minerals.

51. The method of claim 49, wherein the feed f the ore material comprises at least 0.5 weight percent of copper in one or more of copper-containing sulfide minerals.

52. The method of claim 49, wherein the nonferrous base metal concentrate comprises at least 5 weight percent of the nonferrous base metal.

53. The method of claim 47, wherein the collector reagent is a xanthate collector reagent.

54. The method of claim 47, wherein the flotation gas comprises no more than 10 volume percent oxygen gas.

55. The method of claim 47, wherein the flotation gas comprises at least 95 volume percent nitrogen gas.

56. The method of claim 47, wherein the feed of the ore material comprises a sheet silicate mineral; and the method comprises, prior to or during the flotation, adding to the ore material a depressant reagent to suppress floating of the sheet silicate material during the flotation.

57. A method for flotation processing of a base metal sulfide ore material containing base metal sulfide mineral and sheet silicate mineral, the method comprising:

flotation of a feed of the ore material to produce a sulfide concentrate enriched in the metal sulfide mineral relative to the feed of the ore material and to produce a flotation tail depleted in the metal sulfide mineral relative to the feed of the ore material, the flotation comprising introducing a flotation gas into a slurry containing the ore material in particulate form, with the sulfide concentrate being collected from froth at the top of the slurry;

the flotation gas being selected from the group consisting of a gas composition essentially free of oxygen gas and a gas composition comprising no more than 15 volume percent oxygen gas; and prior to or during the flotation, adding to the ore material at least a collector reagent, a lead-containing activator reagent and a depressant reagent, the depressant reagent being an organic material having an effect of suppressing floating of the sheet silicate mineral during the flotation.

58. The method of claim 57, comprising prior to the flotation, reducing pH of feed slurry containing the feed of the ore material from a basic pH to an acidic pH.

59. The method of claim 58, wherein the acidic pH is in a range of from pH 3 to pH 6.

60. The method of claim 57, comprising prior to or during the flotation, adding a frother reagent, the performance of which is affected by use of the depressant reagent.

* * * * *

UNITED STATES PATENT AND TRADEMARK OFFICE
CERTIFICATE OF CORRECTION

PATENT NO. : 6,679,383 B2
DATED : January 20, 2004
INVENTOR(S) : Gathje et al.

It is certified that error appears in the above-identified patent and that said Letters Patent is hereby corrected as shown below:

Title page,
Item [56], References Cited, OTHER PUBLICATIONS, insert the following:

-- Rybas, V. et al., "Ecological Outlook for the New Technology of the Copper-Nickel Ore Benefication Based on the Flotation with Nitrogen", XVIII International Mineral Processing Congress, Sidney, Australia, pp. 997-998, May 23-28, 1993.

Rybas, V.V. et al., "The Use of Nitrogen in the Beneficiation of Copper-Nickel Ores", USSR, Tsvetnaia Metallugica, Moscow (Non-Ferrous Matallurgy) 1989 (2), pp. 112-114. (English translation provided).

Rybas, V.V. et al., "Industrial Use of Nitrogen in Ore Flotation in the Norilsk Beneficiation Plant", Tsvetnaia Metallurgila, Moscow (Non-Ferrous Metallurgy) 1990 (2), pp. 93-95. (English translation provided).

Simmons, G.L., "Flotation of Auriferous Pyrite Using Santa Fe Pacific Gold's N2 TEC Flotation Process", SME Annual Meeting, Denver, Colorado, Feb. 24-27, 1997.

Talkington, Raymond W. et al., "Trends in the Distribution of the Precious Metals in the Lac-Des-Iles Complex, Northwestern Ontario", Canadian Mineralogist, Vol. 22, pp. 125-136 (1984).

Tarkian, M. et al., "Platinum-Group Elements In Porphyry Copper Deposits: A Reconnaissance Study, Mineralogy and Petrology", Vol. 65, pp. 161-183 (1999).

de Villiers, J.P.R. et al., A Mineraological Investigation of Ores From the Merensky Reef And Their Flotation Products, National Institute For Metallurgy, Report No. 1966, 31st March, 1978, Reissued 31st March, 19/80. --

Column 19,
Line 16, delete the word "rmicrons", and insert therefor -- microns --.

Column 24,
Line 52, delete the word "that", and insert therefor -- than --.

Column 26,
Line 42, delete the word "that", and insert therefor -- than --.
Lines 57-58, delete the words "each of the first conditioning and the second conditioning", and insert therefor -- the conditioning --.

UNITED STATES PATENT AND TRADEMARK OFFICE
CERTIFICATE OF CORRECTION

PATENT NO. : 6,679,383 B2
DATED : January 20, 2004
INVENTOR(S) : Gathje et al.

It is certified that error appears in the above-identified patent and that said Letters Patent is hereby corrected as shown below:

Column 27,
Line 24, delete the word "that", and insert therefor -- than --;
Line 33, delete the word "comprised", and insert therefor -- comprises --;
Line 38, delete the word "f", and insert therefor -- of --.

Signed and Sealed this

Thirteenth Day of April, 2004

JON W. DUDAS
*Acting Director of the United States Patent and Trademark Office*